Feb. 23, 1932. E. L. WATKINS 1,846,504
CIRCUIT OPENING AND CLOSING DEVICE
Filed Feb. 1, 1929 2 Sheets-Sheet 1

Inventor
-E. L. Watkins-
By M. Talbert Dick
Attorney

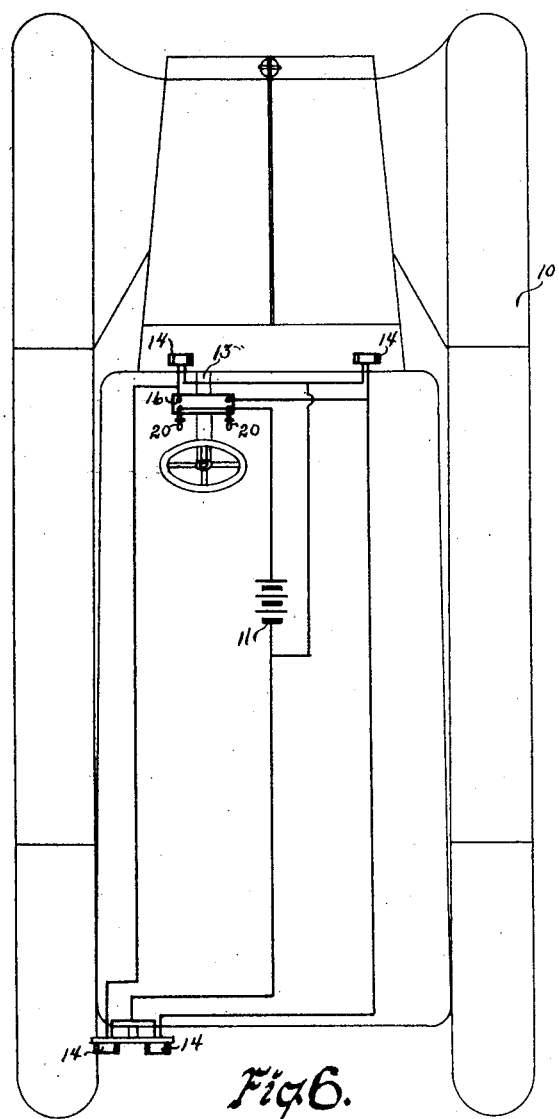

Patented Feb. 23, 1932

1,846,504

UNITED STATES PATENT OFFICE

EDWARD L. WATKINS, OF GRIMES, IOWA

CIRCUIT OPENING AND CLOSING DEVICE

Application filed February 1, 1929. Serial No. 336,709.

The principal object of this invention is to provide a circuit opening and closing device for automotive vehicles and the like.

A further object of this invention is to provide a signalling device that may be easily and conveniently operated from a position inside the vehicle.

A still further object is to provide a vehicle signalling device that may be appreciated by those it is intended for both night and day and one that may readily be seen from a position in front of the vehicle as well as from a position in the rear of the vehicle.

A still further object is to provide a directional signalling device for automobiles and the like that will automatically be returned to normal condition without any attention from the operator after the vehicle has completed its turn.

A still further object of this invention is to provide a directional signalling device for automotive vehicles capable of having its operation visibly observed by the driver of the vehicle.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 6 is a diagrammatic view of the electric wiring of the invention when the same is secured to a vehicle.

Figure 1:
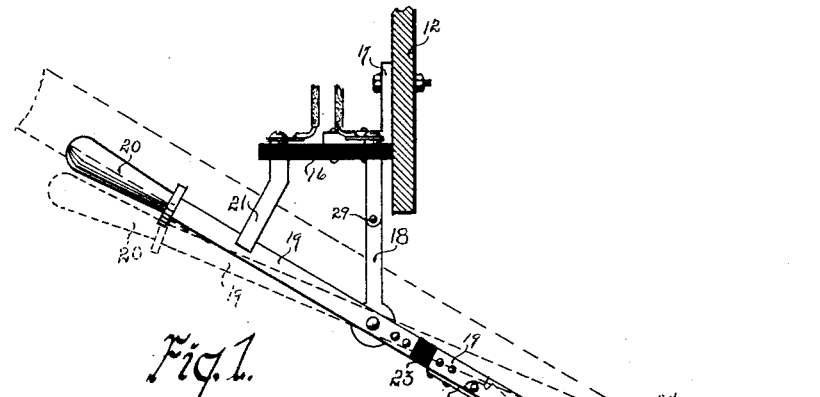
Fig. 1 is a side view of the switch portion of the device mounted on the instrument board and steering column of the vehicle.

There are many directional signal devices on the market actuated by a switch or switches on the instrument board of the vehicle, or steering wheel assembly. If the switch is entirely controlled by the steering apparatus of the vehicle, the vehicle is well in the turn before the signal goes on. If the switch is manually operated, it is usually forgotten after the turn is made and not turned off, and in either system its operation cannot be visibly ascertained by the driver of the vehicle. I have overcome these disadvantages as will be appreciated by those skilled in the art.

I have used the numeral 10 to designate the automotive vehicle having a battery 11, instrument board 12, and steering wheel shaft 13. My circuit opening and closing is accomplished by four lamps 14. Two of these lamps are mounted on the rear end of the vehicle for the benefit of those in the rear of the vehicle and two on the engine cowling for benefit of those in front of the vehicle. The two lamps on the right side signal (when illuminated) that the vehicle is about to or is making a right turn and the two left lamps signal that the vehicle is about to or is making a left turn. The right side lamps are controlled by a right switch and the left side lamps by a left switch, both of which are in electrical communication with the battery 11, by the usual well-known system of wiring shown in Fig. 6.

Figure 2:
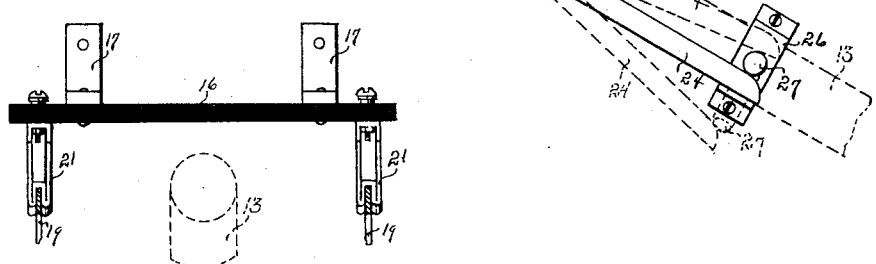
Fig. 2 is a front end sectional view of a portion of the switch used in the device.
Figure 3:
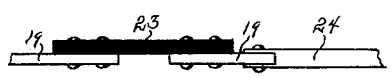
Fig. 3 is a top plan view of a portion of one of the switch operating handles and illustrates the method of electrically insulating the same from the steering column of the vehicle.
Figure 4:
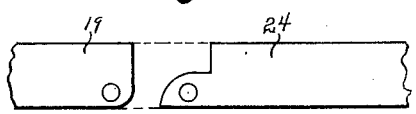
Fig. 4 is a side view of the hinged portion of one of the switch operating handles.
Figure 5:
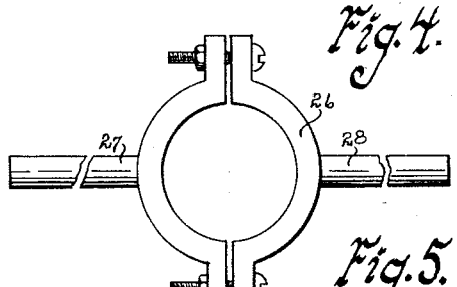
Fig. 5 is an end view of the collar and lugs designed to be secured to the steering shaft or column for automatically throwing the switch out of contact after the vehicle has completed its turn.

I will now describe the right and left switches for controlling the illumination of the lamps. The numeral 16 designates a horizontal base member of nonconductive material secured to the instrument board 12 by the brackets 17, and directly above the steering wheel column, as shown in Fig. 1 and Fig. 2. Extending downwardly from the base 16 and on each side of the steering column is a metal arm 18. Each of these arms have pivoted at their free ends a metal switch bar 19 having a handle member 20 extending parallel with and on each side of the steering column, as shown in the drawings.

Extending downwardly from the base member, on each side of the steering column, and capable of receiving one of the two switch bars 19, respectively, is a metal blade receiving contact member 21. By this construction, if the electric circuit of the left hand lamps is making contact with the members 18 and 21 on the left end of the base member 16 and is broken thereby, as shown in Fig. 1, the circuit may be made or broken by electrically connecting the said members 18 and 21. This is accomplished by the bar 19 pivoted to the left arm 18. In other words, if the bar 19 is lifted until it engages and is yieldingly held by the member 21, the circuit will be completed and the left lamps will be illuminated, and informing people that the operator intends to or is turning to the left.

In a like manner, the circuit of the right lamps is in electrical communication with the members 18 and 21 on the right end of the base 16 and is made or broken by the bar 19 pivoted to that member 18.

To manually break the circuit and extinguish the lights in either the left or right signal lamps, either the left or right handle members 20 is moved downwardly, respectively, to a point out of engagement with the member 20. This position is shown in dotted lines in Fig. 1. If the vehicle operator intends to turn to the left he should lift the handle 20 on the left side of the steering column and if he intends to turn to the right he should lift the handle members 20 on the right side of the steering column.

Beyond the pivot point of each of the bars 18 and in their length is a section 23 of non-conductive material in order that no electrical circuit can exist beyond these points. Hinged on the forward ends of each of the bars 19 is a second bar 24, having its forward upper end portion rounded, and so designed that it can swing downwardly on its hinged point below the longitudinal axis of the bar 19 to which it is secured, but is prevented from swinging above the longitudinal axis of the bar 19 to which it is secured. The numeral 25 designates a leaf spring secured to each bar 19 and engaging the bar 24 secured to that bar 19 for yieldingly holding it in a parallel plane to the longitudinal axis of that bar 19 to which it is secured. The numeral 26 designates a detachable collar secured on the steering wheel shaft 13 having the two diametrically opposite radial extending projections or lugs 27 and 28, capable of engaging the two bars 24 on each side of the steering shaft, respectively, in the manner illustrated in Fig. 1.

The purpose of this part of the device is to automatically move the bars 19 out of electrical engagement with the members 21, as the vehicle completes its turn. Assuming that the right bar 19 has been manually placed in engagement with the member 21 before the turn is commenced, and the right signal lamps are illuminated, the lug 27 will break the hinge joint of the bar 19 and 24 and slide over and past the end of the bar 24 as the steering shaft is rotated to the right for the turn. As soon as the lug 27 passes the bar 24, the spring 25 will return the bar 24 into a longitudinal line with the bar 19 to which it is secured. When the turn is completed the steering shaft 13 will naturally be rotated to the left until a normal position is obtained. This procedure however will cause the lug 27 to engage the underside of the bar 24 and carry it upwardly and as the bar 24 cannot swing above the longitudinal axis of the bar 19 before its pivot point on the arm 18 will automatically be moved downwardly out of engagement with the member 21 and the right signal lamps will be extinguished. The left directional signal lamps are extinguished in the same manner by the lug 28 engaging the bar 24 on the left side of the steering wheel shaft. If the lugs 27 and 28 rotate upwardly far enough they will slide past the underside of the bar 24 which they are engaging and the handles 20 are then free to be manually moved upwardly into engagement with the members 21. If this action does not take place automatically it may be manually accomplished by moving the handle 20 toward the steering column and slipping the bar 24 over the end of the lug which is engaging that bar. This horizontal rotation of the bars 19 and 24 is possible by the arms 18 having the swivel 29 in their lengths. Such a signalling device will inform not only other drivers of vehicles as to the intention of the operator, but pedestrians as well.

Some changes may be made in the construction and arrangement of my improved circuit opening and closing device for vehicles without departing from the real spirit and purpose of my invention, and it is my intention to cover by my claims any modified forms of structure or use of equivalents which may be reasonably within their scope.

I claim:

1. In a device of the class described, a supporting base member of non-conductive material designed to be secured to the instrument board of an automotive vehicle and above the steering shaft of the vehicle, an arm secured to said supporting base member and having a swivel connection in its length for permitting the independent movement of the lower portion of the said arm relative to its upper portion, an electrical contact member engaging said arm, a blade receiving contact member secured to said supporting base member, a metal switch bar pivotally secured to the free end of said arm capable of being swung into said blade receiving contact member and yieldingly held therein, a lug member designed to be secured to said steering shaft, a bar member of non-conductive material rigidly secured to one end of said first mentioned bar member, a third bar member pivoted to said second bar member having its free end rounded at one of its corners and capable of engaging either side of said lug secured to said steering shaft, a means for limiting the movement of said third bar to one direction relative to said second bar, and a spring member for yieldingly holding said third mentioned bar parallel with said second bar.

2. In a device of the class described, a base member designed to be secured inside the seating compartment of an automotive vehicle, an arm extending from said base member, a second arm swiveled to said first arm, an electrical contact member secured to said base member, a switch bar pivotally secured near one of its ends to said second arm capable of being moved to a position for making electrical contact with said contact member, a lug designed to be secured to the steering shaft of the vehicle, and a second bar member having one of its ends hingedly secured to one of the ends of the first mentioned bar and its other end capable of being engaged by said lug when said steering shaft is rotated.

3. In a device of the class described, a base member designed to be secured inside the seating compartment of an automotive vehicle, an arm extending from said base member having a swiveled construction in its length for permitting the forward and rearward swinging movement of its lower end portion, an electrical contact member secured to said base member, a switch bar pivotally secured near one of its ends to the lower portion of said arm capable of being moved to a position for making electrical contact with said contact member, a lug designed to be secured to the steering shaft of the vehicle, a second bar member having one of its ends hingedly secured to one of the ends of the first mentioned bar and its other end capable of being engaged by said lug when said steering shaft is rotated, and a means for yieldingly holding said second bar parallel with said first bar.

4. In a device of the class described, a base member designed to be secured inside the seating compartment of an automotive vehicle, an arm extending from said base member having a swiveled construction in its length for permitting the forward and rearward swinging movement of its lower end portion, an electrical contact member secured to said base member, a switch bar pivotally secured near one of its ends to the lower portion of said arm capable of being moved to a position for making electrical contact with said contact member, a lug designed to and capable of being adjustably secured on the steering shaft of said vehicle, and a second bar member having one of its ends hingedly secured to one of the ends of the first mentioned bar and its other end capable of being engaged by said lug when said steering shaft is rotated.

5. In a device of the class described, a base member designed to be secured in the seating compartment of an automotive vehicle, an arm extending from said base member, terminating at one side of the steering shaft of said vehicle and having a swiveled construction in its length for permitting the forward and rearward swinging movement of its lower end portion, a switch bar pivoted near its lower end to the lower portion of said arm, a blade receiving contact member for receiving and holding said switch bar when it is desired to make an electrical circuit, a lug designed to be secured on said steering shaft, a second bar pivoted to the lower end of said first mentioned bar having its movement limited in one direction and terminating adjacent said lug, and a leaf spring for yieldingly holding said second bar adjacent the limit of its rotation in one direction.

6. In a device of the class described, a supporting base member designed to be secured in the seating compartment of an automotive vehicle and above its steering shaft, an arm extending from said base member, terminating adjacent one side of said steering shaft and having a swiveled construction in its length for permitting the forward and rearward swinging movement of its lower end portion, a blade receiving contact member secured to said base, a switch bar pivoted near its lower end to the lower portion of said arm, a handle member on the upper end of said switch bar for moving the same upwardly in and downwardly out of contact with said blade receiving contact member, a lug designed to be secured to said steering shaft and extending to the side of the same when the vehicle is moving in a straight path, a second bar hinged to the lower end of said first mentioned bar and having its free end terminating just beyond said lug, a means for preventing said second bar to move upwardly beyond a longitudinal parallel plane with said first mentioned bar, and a means for yieldingly holding said second bar longitudinally parallel with said first mentioned bar.

7. In a device of the class described, a base member designed to be secured inside an automotive vehicle and above the steering shaft of said vehicle, an arm extending from said base member to one side of said steering shaft and having a swiveled construction in its length for permitting the forward and rearward swinging movement of its lower end portion, a second arm extending from said base member to the other side of said steering shaft and having a swiveled construction in its length for permitting the forward and rearward swinging movement of its lower end portion, a blade receiving contact member adjacent said first mentioned arm, a second blade receiving contact member adjacent said second mentioned arm, a switch bar pivotally secured to the lower ends of each of said arms and capable of being moved into contact with said blade receiving contact members, respectively, a collar member designed to be secured to said steering shaft, two lugs on said collar extending diametrically opposite from each other and to each side of said steering shaft when said vehicle is moving in a straight path, a bar pivoted to each of said two switch bars capable of being engaged by said two lugs, respectively, when said steering shaft is rotated, and a means for limiting both of said last mentioned bars to one direction.

EDWARD L. WATKINS.